US008479367B2

(12) United States Patent
Hurley et al.

(10) Patent No.: US 8,479,367 B2
(45) Date of Patent: Jul. 9, 2013

(54) SPARK PLUG BOOT PULLER, METHODS OF REMOVING SPARK PLUG BOOTS WITHOUT DAMAGING THE BOOTS, AND REUSABLE SPARK PLUG BOOT KITS

(76) Inventors: Charles Hurley, Summerville, SC (US); Thomas J. Zagami, Ellicott City, MD (US)

( * ) Notice: Subject to any disclaimer, the term of this patent is extended or adjusted under 35 U.S.C. 154(b) by 575 days.

(21) Appl. No.: 12/265,261

(22) Filed: Nov. 5, 2008

(65) Prior Publication Data

US 2009/0119897 A1 May 14, 2009

Related U.S. Application Data

(60) Provisional application No. 60/986,783, filed on Nov. 9, 2007.

(51) Int. Cl.
*B23P 19/00* (2006.01)

(52) U.S. Cl.
USPC .......................................................... 29/426.6

(58) Field of Classification Search
USPC .................. 29/280, 219, 426.5, 402.03, 762, 29/426.6, 278, 426.1, 234, 235
See application file for complete search history.

(56) References Cited

U.S. PATENT DOCUMENTS 3,103,836 A * 9/1963 Bristol, III ...................... 29/764
3,209,503 A * 10/1965 Mostoller .................... 52/404.1
4,202,088 A 5/1980 Hansen
4,240,192 A * 12/1980 Davis .......................... 29/426.6
4,425,697 A 1/1984 Simmons
4,780,942 A * 11/1988 Bernat ........................... 29/219
5,253,408 A 10/1993 Wright
D506,907 S 7/2005 Olivarez
7,017,247 B2 * 3/2006 Detzel ......................... 29/221.5
7,243,419 B2 7/2007 Cheng

* cited by examiner

*Primary Examiner* — John C Hong
(74) *Attorney, Agent, or Firm* — Whitham Curtis Christofferson & Cook, PC

(57) ABSTRACT

An inventive spark plug boot puller removes a spark plug boot from the spark plug on which it is booted, without damaging the spark plug boot. A method for removing a spark plug boot so that the boot can be reused is provided. Kits containing reusable spark plug boots with cooperating spark plug boot puller tools are provided.

7 Claims, 2 Drawing Sheets

SPARK PLUG BOOT PULLER, METHODS OF REMOVING SPARK PLUG BOOTS WITHOUT DAMAGING THE BOOTS, AND REUSABLE SPARK PLUG BOOT KITS

RELATED APPLICATION

This application claims priority to U.S. provisional application Ser. No. 60/986,783 filed Nov. 9, 2007 entitled "Spark Plug Boot Puller" by Charles Hurley and Thomas Zagami.

FIELD OF THE INVENTION

The invention relates to spark plug boots, particularly to removing spark plug boots and especially to facilitating reusability of spark plug boots.

BACKGROUND OF THE INVENTION

Certain approaches for removing spark plugs have been provided. However, spark plugs have changed over time and spark plug removal technology currently is inadequate for conventional spark plugs.

As background, the following literature is mentioned in chronological order:

U.S. Pat. No. 4,202,088 issued May 13, 1980 to Hansen for "Spark plug boot puller."

U.S. Pat. No. 4,425,697 issued Jan. 17, 1984 to Simmons for "Spark plug boot remover."

U.S. Pat. No. 5,253,408 issued Oct. 19, 1993 to Wright for "Extraction tool."

U.S. Pat. No. D506,907 S issued Jul. 5, 2005 to Olivarez for "Grounding tool with locking mechanism for removing spark plug boot."

U.S. Pat. No. 7,243,419 issued Jul. 17, 2007 to Cheng for "Spark plug boot removal tool."

BRIEF DESCRIPTION OF THE DRAWINGS

The invention may be appreciated with reference to the attached figures, without the invention being limited thereto.

SUMMARY OF THE INVENTION

The present inventors have considered today's more-durable spark plugs to which spark plug boots tend to stick and be difficult to pull off, and in solution to the problem have invented a spark plug boot puller and a method of pulling apart today's spark plugs and spark plug boots.

The invention in one preferred embodiment provides a method of removing a spark plug boot from a spark plug booted by the spark plug boot, comprising: separating the spark plug boot from the spark plug without damaging the spark plug boot (such as, e.g., a separating step that comprises inserting, between the spark plug boot and the spark plug, a relatively-flat, relatively-rectangular surface that is a terminus of a hook (such as, e.g., a U-shaped hook; a J-shaped hook); a separating step that comprises inserting a U-shaped hook between the spark plug boot and the spark plug booted by the spark plug boot, and maneuvering the U-shaped hook until the spark plug boot is separated from the spark plug; and other separating steps).

The invention in one preferred embodiment of the invention provides: a spark plug boot puller, comprising: a U-shaped hook, such as, e.g., a spark plug boot puller consisting essentially of the hook and a handle member; a spark plug boot puller further comprising an adjustable handle member; etc.

The invention in another preferred embodiment provides a method of separating a spark plug boot and a spark plug, comprising: inserting a U-shaped hook between the spark plug boot and the spark plug, and pulling until the spark plug boot and the spark plug have separated.

In another preferred embodiment, the invention provides a reusable-spark-plug-boot kit, comprising: at least one spark plug boot; and a spark plug boot puller, wherein the spark plug boot puller cooperates with at least one spark plug boot installed on a spark plug, to remove the boot from the spark plug without damage to the boot.

The invention in another preferred embodiment provides a spark plug boot puller, comprising: a hook having a terminus for insertion between a spark plug boot and a spark plug booted by the spark plug boot; wherein the terminus has substantially rectangular dimensions (such as, e.g., substantially a rectangle that is about 3/16 inch by about 1/16 inch; etc.).

DETAILED DESCRIPTION OF A PREFERRED EMBODIMENT OF THE INVENTION

Figure 1:
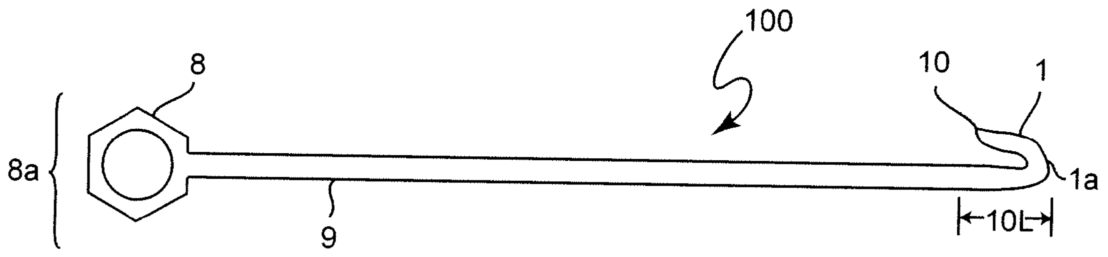
FIG. 1 is a cross-section side view of an inventive spark plug boot 100 puller in one embodiment.
Figure 2:
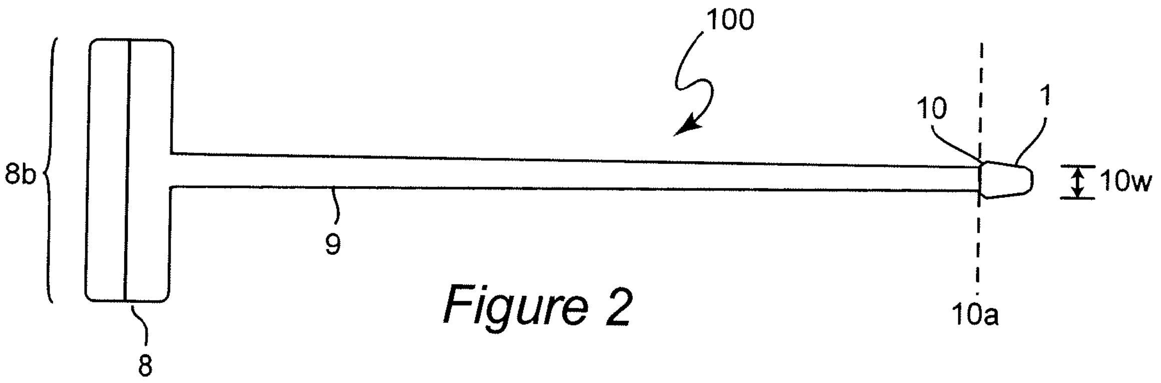
FIG. 2 is the inventive spark plug boot puller 100 of FIG. 1 rotated 90 degrees and seen in a top view.
Figure 3:
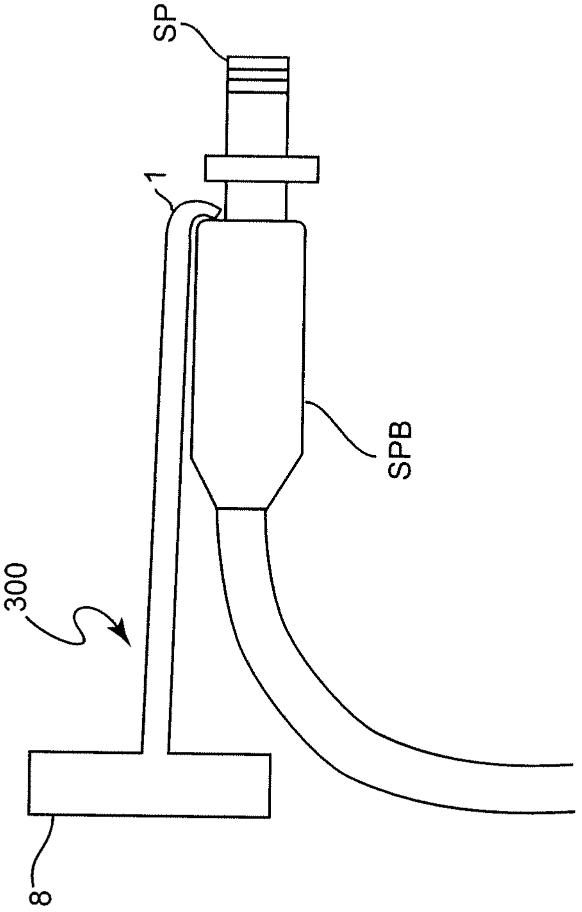
FIG. 3 depicts an inventive spark plug boot puller 300 in use pulling a spark plug boot SPB off a spark plug SP.

The invention is discussed with reference to a preferred embodiment and FIGS. 1-3 without the invention being limited thereto. Referring to FIGS. 1, 2, 3, the spark plug boot puller 100 or 300 includes a U-shaped hook (also called a J-shaped hook) 1. Preferably the spark plug boot puller 100 or 300 is formed of steel, steel alloy or another hard, strong material that can withstand pulling forces. The hook 1 must be shaped to be insertible between a spark plug boot and a spark plug.

Herein, "U-shaped" excludes a V-shape which has been found to tear the spark plug boot too easily. The U-shape avoids the risk of tearing the spark plug boot and gets around the boot to remove the boot.

The tongue 10 of the hook 1 should be wide enough to exert force when inserted between the spark plug boot and the spark plug, but not too wide to practically be inserted therebetween. A preferred example of a thickness 10*t* of a tongue 10 of a hook 1 is about 1/16 inch, for separating spark plugs such as on Fords, GM's, Chryslers, Toyotas, etc., and other vehicles that do not use a Hemi-type spark plug. With regard to those sorts of spark plugs, for a boot puller tool formed from steel, we have found that a tongue thickness 10*t* much thicker than about 1/16 inch has trouble fitting between the boot and the plug. On the other end, we have found that for a tool formed from steel, a tongue thickness 10*t* much smaller than about 1/16 inch tends to become too flimsy and can bend.

It will be appreciated that in order for the hook 1 to be useable, the boot puller 100 or 300 must include a handle 9. The tongue 10 and the handle 9 form opposite sides of the U shape, with the tongue 10 extending from one end of the U shape and the handle 9 extending from the other end of the U shape. In a preferred example, the tongue length 10L (FIG. 1) which is the distance from the U shape to where the tongue 10 ends, is about 3/8 inch.

Preferably the tongue 10 ends not in a sharpened or pointed manner (that is, the case where thickness 10*t* is near-zero is not preferred) but rather, some reasonable-to-machine minimal thickness 10*t* with about 1/16 inch being a preferred example. In the case of a machined steel boot puller, too-small thickness 10*t* is to be avoided because a pointy end has the risk of tearing or puncturing the boot. Likewise, jagged or irregular feature for the hook 1 are to be avoided for the same reason.

The U or J shape of the hook 1 need not have perfect symmetry with regard to the parts of the hook 1 formed respectively by the tongue 10 and the handle 9. For example, the tongue 10 may be somewhat angled outwards into a more open U shape than if the tongue 10 and the handle 9 were strictly parallel.

The handle 9 must extend of sufficient length so that pulling forces can be generated when the boot puller 100 is used manually. A preferred example of a length of a handle 9 is about 14 cm from the hook 1 at its curved part 1*a* to where the handle 9 joins the hand grip 8.

The handle 9 and the hand grip 8 are either of unitary construction or are welded together.

A preferred shape of the hand grip 8 is a hexagonal solid shape, with the handle 9 being of a diameter such that the handle 9 fits between two of a user's figures and the user's fingers can wrap around the hand grip 8. The hand grip 8 may be formed as other shapes besides a hexagonal solid, which is shown for illustrative purposes. It is preferred for the hand grip 8 to have a gripping exterior.

The width 8*a* of the hand grip 8 preferably is such that the hand grip 8 is sized about the size of a finger of smallish thickness, such as a width 8*a* of about 1.5 cm.

The length 8*b* of the hand grip 8 preferably is smaller than an average palm of a user, such as a length 8*b* of about 4.2 cm.

FIG. 3 shows a boot puller 300 in use. Boot puller 300 corresponds to boot puller 100 but is given a new number because of the different handle lengths. Boot puller 300 is gripped by a hand of a human user at hand grip 8 and the hook 1 is inserted between the spark plug SP and spark plug boot SPB. Once the hook 1 is inserted between the spark plug SP and spark plug boot SPB, manual pulling pressure is applied until the spark plug boot SPB and spark plug SP separate.

Figure 4:
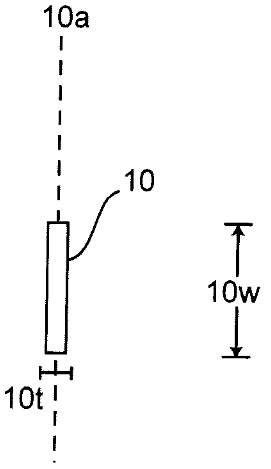
FIG. 4 is an enlarged cross-sectional view (not drawn to scale) of a surface area of the flat end of the tongue 10 of the hook 1 of the spark plug boot puller 100 of FIG. 2 at the part of the tongue 10 shown by line 10*a*.

Referring to FIGS. 1, 2 and 4, a tongue 10 for use in the invention has dimensions of length 10L, width 10W and thickness 10*t*, with a flat end of the tongue being a 10W by 10*t* rectangle; a preferred tongue has length 10L of about 3/8 inch, width 10W of about 3/16 inch, and thickness 10*t* of about 1/16 inch.

The invention may be used with today's spark plug and spark plug boot combinations which particularly tend to stick compared to past combinations. Examples of such spark plugs with which the invention may be used are, e.g., Fords, GM's, Chryslers, Toyotas, and other vehicles that do not use a Hemi-type spark plug.

The following examples are provided for better appreciating the invention, without the invention being limited thereto.

INVENTIVE EXAMPLE 1

Actual Prototype

The spark plug boot puller of this example was formed by the following steps in the following order to construct the shaft/hook:

1. Cut 5/32" steel rod stock to a length of 7 inches
2. Heat one end to a temperature of 1200 degrees
3. Forge with a hammer and anvil to taper back 3/8" to a wedge
4. Place end in vice, 3/8" from end, and bend around and shape into a "U"
5. File off sharp edge of hook and file down sides of hook body back to 5/32" rod stock
6. Heat hook end to a temperature of 1200 degrees and immerse into ice water to re-temper metal The following steps were followed to construct the T Handle:

1. Drill a 5/32" hole into the center of a 3/8" coupling
2. Insert hook into drilled hole
3. Insert two 3/8" hex head bolts into each end of the coupling and tighten each hex head bolt evenly
4. Cut off bolt heads and file to remove rough edges There was thereby actually constructed a spark plug boot puller formed of steel according to FIGS. 1 and 2.

INVENTIVE EXAMPLE 2

Use of Actual Prototype

The spark plug boot puller of Example 1 has been tested on: Fords; GM's; Chryslers; and Toyotas.

The invention therefore advantageously provides the ability to remove a spark plug boot, without damaging the boot, so that the spark plug boot can be reused. The invention therefore is superior to conventional ways of removing a spark plug boot that would damage the boot (and perhaps the plug) and further give rise to the expense of using a new boot and wire. In the present invention, advantageously it is possible to save the boot and wire so that a removed boot optionally may be reused (that is, rebooted onto a spark plug).

While the invention has been described in connection with preferred embodiments, it will be understood by those skilled in the art that other variations and modifications of the preferred embodiments described above may be made without departing from the scope of the invention.

What we claim is:

1. A method of removing a spark plug boot from a spark plug wherein the spark plug boot and spark plug are a sticky combination, comprising:

inserting a tongue having a thickness of about 1/16 inch between the boot and the plug, wherein the tongue ends at a relatively-flat, relatively-rectangular surface that is a rectangle-shaped terminus of a U-shaped hook and wherein said rectangle-shaped terminus is approximately 3/16 inch-by-1/16 inch, wherein the hook is included in a spark plug boot puller that has a T-shaped handle; and by gripping a hand grip which has a width of about 1.5 cm and a length of about 4.2 cm, and maneuvering the hook that was inserted in the inserting step, separating the spark plug boot from the spark plug without damaging the spark plug boot, until the spark plug boot of the sticky combination is separate from the spark plug but undamaged;

wherein the tongue, the T-shaped handle, the hook and the hand grip used in the method steps are contained in the spark plug boot puller, and wherein the spark plug boot puller is characterized by:

a handle length of about 14 cm which is a distance from a curved part of the hook to where the handle joins the hand grip, and a tongue length, which is a distance from U shape to where the tongue ends, of about 3/8 inch.

2. A method of removing a spark plug boot from a spark plug wherein the spark plug boot and spark plug are a sticky combination, comprising inserting a U-shaped hook between the spark plug boot and the spark plug booted by the spark plug boot, wherein the hook ends at a terminus that is a relatively-flat, relatively-rectangular surface, and the hook is included in a spark plug boot puller that has a T-shaped handle; and maneuvering the U-shaped hook until the spark plug boot is separated from the spark plug, thereby separating the spark plug boot from the spark plug without damaging the spark plug boot.

3. A method of separating a spark plug boot and a spark plug, comprising:

inserting a U-shaped hook between the spark plug boot and the spark plug, wherein the hook ends at a terminus that is a relatively-flat, relatively-rectangular surface; and pulling until the spark plug boot and the spark plug have separated.

4. The method of claim 3, wherein the inserting and pulling steps use a spark plug boot puller that consists of the hook and the T-shaped handle.

5. The method of claim 4, wherein the handle is an adjustable handle member.

6. The method of claim 3, wherein the terminus is an approximately 3⁄16 inch-by-1⁄16 inch rectangle.

7. A method of separating a spark plug boot and a spark plug booted by the boot, by operating a spark plug boot puller that comprises a hook having a terminus, comprising:

inserting the terminus of the hook between the spark plug boot and the spark plug, wherein the terminus has substantially rectangular dimensions, the hook includes a tongue that is about 1⁄16 inch thick, and the spark plug boot puller comprises a T-shaped handle.

* * * * *